Figures 1, 2, 3:
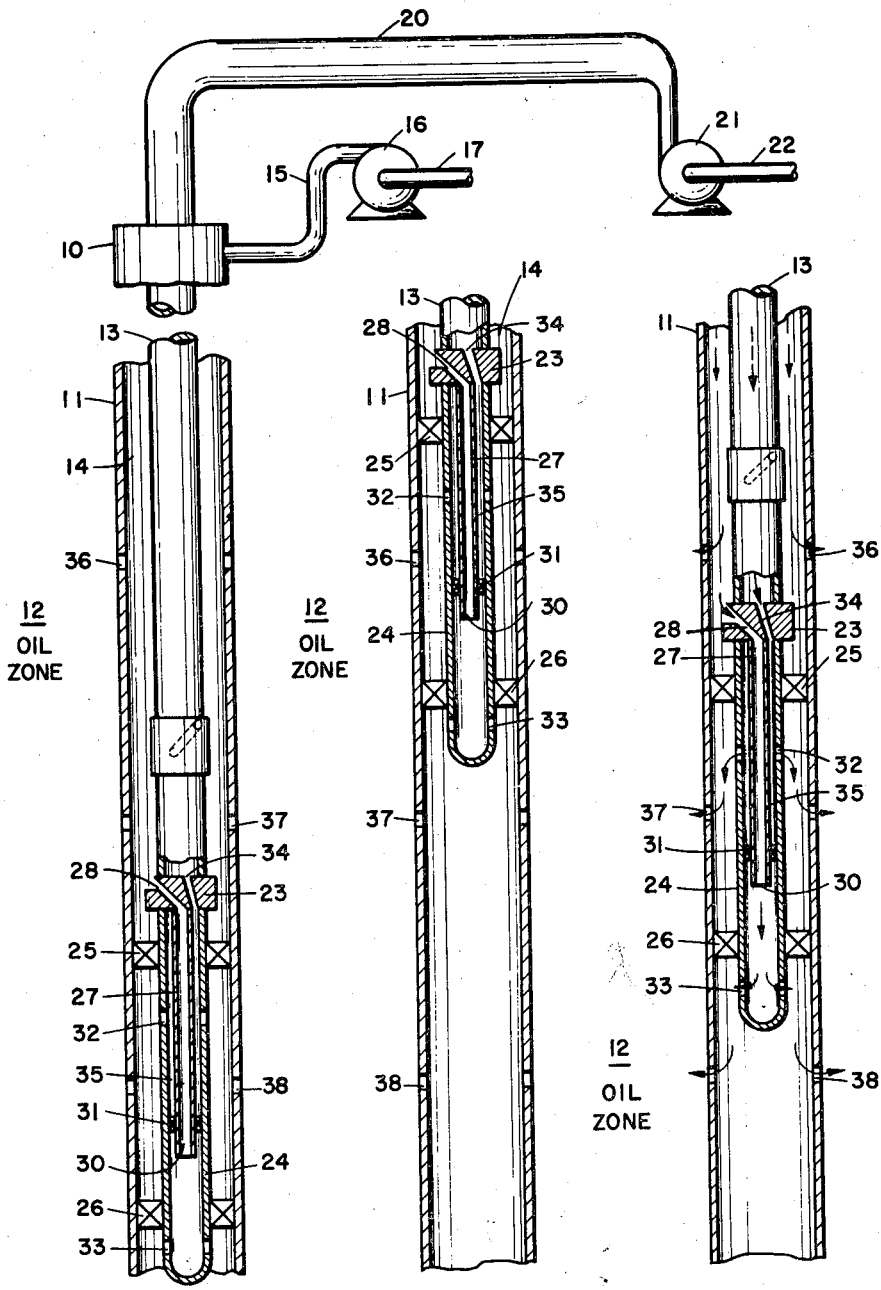

INVENTOR:
J. W. McEVER

INVENTOR
J. W. McEVER
BY J. H. McCarthy
HIS AGENT

United States Patent Office

3,115,931
Patented Dec. 31, 1963

3,115,931
METHOD OF ACIDIZING WELLS
James W. McEver, Billings, Mont., assignor to Shell Oil Company, a corporation of Delaware
Filed Dec. 23, 1959, Ser. No. 861,646
4 Claims. (Cl. 166—42)

This invention relates to the acidization of producing zones of oil and gas wells and pertains more particularly to a method of forming a collection zone or basin of increased porosity and permeability within a producing zone of a well, the basin forming a radially-extending flow or drainage channel extending outwardly in all directions from a well borehole into the producing formation.

In many oil fields it is necessary to acidize the production zone of a formation traversed by a well. Acidization of the producing formation often is carried out at the time the well is completed or at any time thereafter, the treatment oftentimes taking place many years after the well has been on production in order to rejuvenate the flow from the well. In acidizing wells, it has generally been the procedure to position a quantity of acid, for example, a 15% solution of inhibited hydrochloric acid, in the borehole adjacent the producing formation and pump it into the formation at a pressure greater than the formation pressure. This manner of treatment has been satisfactory to a degree although it has been found that large quantities of acid are often wasted when they migrate to formations above and below the producing formation, especially if one of the formations adjacent the producing formation is a water-bearing formation. Not only does some of the acid often migrate to a water-bearing formation but in a like manner water may migrate from the water formation to the oil formation to dilute the acid therein until it no longer achieves the purpose for which it was intended.

It is therefore an object of the present invention to provide a method for acidizing an oil-producing formation within a well, or a portion thereof, in such a manner as to limit the treatment to the particular producing zone without the risk of inadvertently losing control of the direction of the acid as it leaves the borehole.

When acidizing the producing formations of oil wells by presently known methods, the zone of increased porosity and permeability surrounding the well, which is obtained as a result of the acidization operation, is generally in the form of an elongated cylinder normally of a height equal to that of the producing formation. This cylindrically-shaped zone of increased permeability and porosity surrounding the well, acts as a collection zone being fed by the producing formation which extends horizontally beyond this acidized zone. Knowing the porosity of the producing formation and the amount of acid used to acidize the formation, the size of this zone of increased permeability and porosity within the formation can be calculated. In practicing the method of the present invention it has been determined that production of oil from a formation may be increased by a factor of up to three or four with the same volume of acid if the zone of increased porosity and permeability formed in the producing formation around a well borehole is in the form of a thin disc of considerable diameter, rather than in the form of an elongated cylinder of much smaller diameter.

It is therefore a further object of the present invention to provide a method for acidizing a producing formation of a well by focusing the injected acid so that it spreads out radially over a thin disc-shaped area of extended diameter so as to provide a well-fluid collection zone and flow channel back to the well of relatively high permeability compared to the rest of the formation.

After acidizing a producing formation of a well by normal acidizing procedures so that a long cylindrical zone of high permeability and porosity is formed around the well borehole, the direction of flow of production fluid into this zone of high permeability is substantially horizontal.

Another object of the present invention is to provide a method for forming a thin, disc-shaped, well-fluid, collection zone within a producing formation, the collection zone being of relatively high permeability and being positioned relative to the upper and lower extremities of the producing formation so that the fluid from a substantial portion of the producing formation surrounding the well is positioned above the disc-shaped collection zone thus permitting vertical drainage of that portion of the producing formation into the disc-shaped collection zone.

A further object of the present invention is to provide a method for acidizing wells wherein a relatively small amount of acidizing fluid is caused to penetrate radially deep into the formation over a limited vertical distance.

Figures 4, 5:
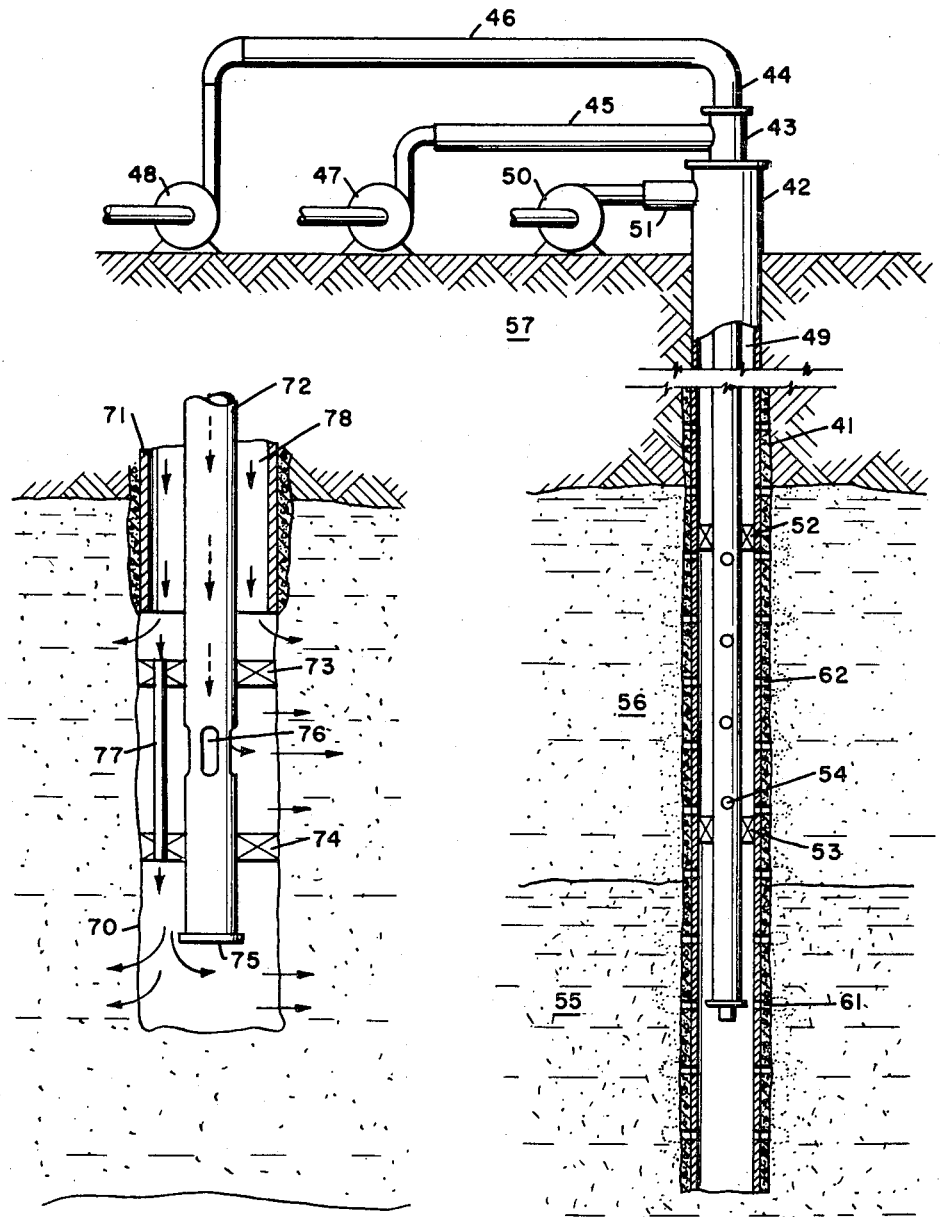

These and other objects of this invention will be understood from the following description taken with reference to the attached drawing, wherein:

FIGURES 1, 2 and 3 are diagrammatic views of a vertical section through a well borehole illustrating various positions at which acidizing equipment is to be set in practicing the method of the present invention;

FIGURE 4 is a vertical section taken through a well borehole diagrammatically showing equipment positioned in a well when it is desired to acidize a producing formation in accordance with one form of the present invention so as to confine the acidizing fluid solely to the producing formation; and, FIGURE 5 is a vertical section taken through a well borehole diagrammatically illustrating one type of equipment which may be employed in acidizing an uncased well in accordance with the method of the present invention.

Referring to FIGURE 1 of the drawing, a wellhead 10 is shown with a well casing 11 extending therefrom to a position opposite an oil-producing formation 12. The well casing 11 is sealed in the well borehole by cement. Depending within the well casing 11 is a tubing string 13. The top of the well casing 11 is closed while the annular space 14 between the casing and the tubing is connected by means of a conduit 15 to a pump 16, the intake 17 of the pump being in communication with a source of fluid, for example, oil (not shown). In a like manner the top of the tubing 13 is connected by means of a conduit 20 to a pump 21 whose intake 22 is connected to a source of acidizing fluid (not shown).

Coupled to the lower end of the tubing 13 by any suitable means, such as by a collar 23, is a pipe sub 24 having a pair of packers 25 and 26 fixedly mounted on the outer surface thereof. The spacing between the packers may be varied and, in general, depends upon the number of perforations in the well casing through which it is desired to inject fluid, as well as the thickness of the zone to be treated. The dual packers 25 and 26 form what is known in oil field terminology as a straddle packer.

A bypass conduit 27 is positioned within the pipe sub 24 in a fluidtight manner with the upper end 28 thereof being in open communication with the annular space 14 between the well casing 11 and the tubing 13. The lower end 30 of the bypass conduit 27 is in open communication with the interior of the pipe sub 24, there being an internal annular packer 31 sealing off the space between the outer surface of the bypass conduit 27 and the inner surface of the pipe sub 24. The pipe sub 24 is provided with two sets of port means, such as perforations 32 in the wall of the pipe sub 24 between the upper packer 25 and the internal packer 31, with a second set of perforations 33 extending through the wall of the pipe sub 24 below the lower packer 26. Alternatively, the lower end of the pipe sub 24 can be open. The collar 23 at the top of the pipe sub 24 is provided with a fluid passageway 34 in open communication at all times between the interior of the production tubing 13 and the annular space 35 between the bypass conduit 27 and the pipe sub 24.

In practicing the method of the present invention, the well casing 11 is perforated preferably at three distinct levels, all of the perforations 36, 37 and 38 being preferably within the oil-producing formation to be acidized. Although the casing 11 is illustrated as having only a single perforation through opposite sides of the casing at the three levels 36, 37 and 38, it is to be understood that any suitable number of perforations may be employed. It is desirable to have perforations extending through the well casing 11 in all directions, say at least at 90 degree intervals, so that fluid injected therethrough will spread circumferentially around the well borehole. The method of the present invention may also be practiced with perforations extending throughout the length of the well casing within the producing formation. It has been found however that satisfactory results may be obtained with four perforations being located at each of the perforation levels 36, 37 and 38. Thus, in a well drilled to a total depth of 9,155 feet, the well casing 11 was perforated at 36 at an interval of between 9,130 and 9,131 feet, while the perforators at 37 were at 9,137 to 9,138 feet, and the perforations 38 were at 9,144 to 9,145 feet. Perforation of the well casing is carried out in any of the various methods known to the art. After the perforating operation has been completed the perforating apparatus is withdrawn from the well.

In the event that the well borehole or well casing contains a drilling fluid, completion fluid, or formation fluid, any fluid of this type is preferably bailed from the well or displaced therefrom with oil in a manner well known to the art. If desired, the oil pumped into the well may be treated by the addition thereto of one or more chemical components to change the characteristics of the oil. For example, a surface-active agent sold by Dow Chemical Company, under the trade name of "Fre Flo" may be added to the oil in various proportions, for example, one gallon of "Fre Flo" for each five barrels of oil, in order to insure easy penetration of the oil into the formation.

In certain oil fields, such for example as in a field where a well casing is cemented in carbonate rock, an operator is not always certain that the bullets or jets of a perforating gun have penetrated through both the well casing, the cement surrounding the casing and into the adjacent producing formation. Therefore, in a preferred manner of practicing the method of the present invention, it is desirable to clean out the perforations 36, 37 and 38 at each level and to establish the fact that perforations actually extend into the producing formation by forcing a small amount of acid through each set of perforations 36 and 38 (FIGURE 1), prior to carrying out the main steps of the present invention.

Thus, as shown in FIGURE 1, after perforating the well casing 11 at three levels, a tubing string 13 having the special pipe sub 24 attached to the bottom thereof is lowered into the well until the packers 25 and 26 carried by the pipe sub 24 straddle one set of perforations, preferably the lower set of perforations 38. A quantity, say 2,000 gallons, of inhibited acid for treating the formation is run down the tubing string 13 and a small amount, say 150 gallons, of the acid is injected under pressure through the perforations 38 to make sure the perforations are open into the producing formation. It is evident that if the well casing is not cemented in place or is not cemented opposite the perforations then this step is not necessary.

The tubing string 13 is then raised to a position shown in FIGURE 2 of the drawing where the packers 25 and 26 straddle the upper perforations 36 in the well casing. Another small quantity of acid is injected through the upper perforations 36 to make sure that they communicate with the producing formation.

The tubing string 13 and its pipe sub 24 are again repositioned so that the packers 25 and 26 carried thereon close off the interior of the well casing 11 above and below the centrally located perforations 37 (FIGURE 3). With the downhole equipment positioned in a manner shown in FIGURE 3, the pumps 16 and 21 of FIGURE 1 are started to pump oil down the tubing-casing annulus 14, while at the same time the inhibited acid is pumped down the tubing string 13. The acid in the tubing passes downwardly through the passageway 34 in the collar 23, thence outwardly through perforations 32 in the wall of the pipe sub 24. The acid is confined between packers 25 and 26 so that the pump pressure forces the acid out of the middle set of perforations 37 and into the producing formation. Simultaneously, a portion of the oil being pumped down the tubing casing annulus 14 flows out the upper set of perforations 37 while the remaining portion of the oil flows through bypass conduit 27 into the pipe sub 24 and thence outwardly through perforations 33 in the bottom of the pipe sub to enter the producing formation through the lower set of perforations 38.

The simultaneous pumping of the acid through perforations 37 while oil is being pumped through perforations 36 and 38 is carried out at pressures and rates sufficient to maintain the radial flows of the acidizing fluid, and the confining oil above and below it, into the formation at substantially equal velocities. With a blanket of oil moving outwardly away from the well borehole above and below the disc-like injection of acidizing fluid and at the same rate thereof, the acidizing fluid is confined for the most part to that narrow portion of the producing formation between the two blankets of confining oil. It is desirable that the flow of acid radiating from the borehole does not get ahead of the confining blanket of oil above and below the acid so as to preclude any fingering of the acid either upwardly or downwardly along a substantially vertical plane.

The fluid being injected as a blanket above and below the acid into the formation is preferably an oil or an oleophilic fluid. From a practical standpoint some of the formation oil previously taken from the same well or an adjacent well is used. Since crude oil is abundant and is later recovered when the well is put on production again, a considerably larger quantity of oil may be used than acid. Hence, the blanket of oil above and below the acid being injected into the formation may be substantially thicker than the blanket of acid. Additionally, since there is no blanket of injected fluid tending to confine the oil within certain limits of the producing formation, i.e., since the top of the blanket of oil may tend to migrate upwardly while the bottom of the bottom blanket of oil will tend to migrate downwardly, in most cases of practicing the method of the present invention, as described with regard to FIGURES 1 to 3, the quantity of oil being injected is substantially greater than the volume of acid being used. For example, four barrels of oil may be used injected into each oil blanket for each barrel of acid being pumped into the formation.

No attempt is made here to set a definite ratio of the quantity of oil to be injected on either side of the blanket of acid to the acid employed. As mentioned hereinabove, with unlimited oil available a considerably larger volume of oil is generally used than is necessary. No attempt is made to state any definite optimum or minimum oil-to-acid ratio as this will generally vary from one oil field to the other and from one particular producing formation to the other. By properly adjusting pump pressures and rates of flow, the radial velocities of the oil blankets and acid blanket being injected into the oil zone can be maintained substantially equal and parallel to the bedding plane of the producing formation if consideration is given to the permeability of the formation to the oil and to the acid being injected, to the viscosities of both fluids, and to the injection pressure maintained. In general, it is easier to pump water into a formation than oil. Thus, due to the presence of acid which tends to increase the porosity of a formation, it would be still easier to inject an aqueous acid solution, of say 15% hydrochloric acid, into a producing formation, than it would be to inject a crude oil, even the same formation oil into the producing formation. Thus, in determining the pump pressures employed to inject the two fluids into the formation, a higher pump pressure must be employed to force the oil into the formation than is used to force the acid into the formation in order that the two fluids enter the formation at equal radial velocities.

It will be apparent to an operator practicing the method of the present invention that the acid, upon entering the producing formation, will tend to open that portion of the producing formation, thus increasing its permeability and porosity so that the acid will enter the fluid zone more easily as the acidization of the formation progresses. In order to maintain the radial flows of both the acid and the oil at equal velocities, it may be necessary to increase progressively the rate of flow of oil into the formation to keep up with the acid injection. Alternatively, instead of increasing the pump pressure on the oil pump to speed up the injection of the oil layers, the pump pressure on the acid pump may be reduced so that the radial flows of acid and oil remain equal.

It is to be understood that crude oils vary greatly in viscosity from one field to the other or from one producing formation to the other. Thus, it is to be recognized that it will be far more difficult to inject a more viscous crude oil or a heavy oil into a formation above and below an acid layer than it would be to inject a low viscosity crude oil or a lighter refined hydrocarbon product. Accordingly, the pump pressures at which the injection of oil and acid are carried out also depend upon the viscosity of the oil being used. While in most drilling locations crude oil is generally available, in some formations it may be found desirable to use a refined oil, such as kerosene or fuel oil, as the injection oil.

In wells having a relatively thin oil-producing formation, such for example as 3 feet, or in wells wherein the oil-producing formation is adjacent a water-producing formation which would tend to dilute acid injected into the oil-producing formation, as will be described hereinbelow with regard to FIGURE 4, it may be found desirable to inject one or both of the oil layers into formations adjacent the oil-producing formation which are of a different permeability than the oil-producing formation. Thus, the permeability of the formations must be taken into consideration in determining the pressures at which both the injection of oil and acid are to be carried out in order to maintain equal radial velocities of the two fluids into the formation. The permeability of the oil-producing formation to acid, and that of the adjacent formations to the oil being used, can be readily determined in a manner well known to the art, such for example as obtaining sidewall cores from each formation during a coring operation. After determining the permeabilities of the two formations, or the permeability of the formation adjacent each of the set of three discharge perforations in a well casing, the viscosities of the oil and/or of the acid may be adjusted, as by the addition of chemicals, or other oils, or other materials, so that the two fluids pass through the respective formations at equal radial velocities when they are injected into the well under a pressure greater than formation pressure and adjusted so that the pressures of the two fluids being injected are substantially equal. If the formation containing the oil and/or other formation fluid is not homogeneously permeable, an adjustment should be made to maintain equal radial velocities at the oil acid interfaces. In general, it is preferred to alter the viscosity of the acid fluid to make it more viscous and hence slow down its penetration rate into the formation. The addition of 10% kerosene to a 15% by weight solution of hydrochloric acid forms a viscous acidizing emulsion with the acid of the internal phase and the kerosene the external phase. Gelling agents may also be added to acid and oil emulsions to decrease their penetration rate.

Referring to FIGURE 4 of the drawing, a well 41 is shown as having a well casing 42 cemented therein with the top of the well casing 42 being closed. Depending within the well casing 42 are concentric tubing strings 43 and 44 which are connected by means of conduits 45 and 46 to pumps 47 and 48. The annular space 49 between the well casing 42 and the tubing string 43 is in communication with the discharge of pump 50 through conduit 51. Mounted on the lower end of the outer tubing string 43 are a pair of axially-disposed packers 52 and 53, the spacing between the packers being predetermined by an operator depending on the thickness of the formation which he wishes to acidize. One or more perforations 54 are provided in the wall of the outer tubing string 43 between the packers 52 and 53 so as to permit the discharge of acid therefrom. The lower end of the outer tubing string 43 is closed while the lower end of the inner tubing string 44 is open, thus permitting the injection of oil from the tubing string 44 into the formation, for example, into a water zone 55, below the packer 53.

In carrying out the method of the present invention with the arrangement of the equipment shown in FIGURE 4 to acidize an oil zone 56, which, for example, may be very thin, e.g., in the order of 3 feet, the packers 52 and 53 may be positioned just below the top of the oil zone and just above the bottom of the oil zone, after perforating the well casing, as illustrated. Pumps 48 and 50 are connected to a source of oil or oils (not shown) of the same or different viscosities, while the intake of pump 47 is connected to the source of acidizing fluid to be used. Oil is then pumped, by pumps 48 and 50, down the casing-tubing annulus 49 and down the innermost tubing string 44, to be discharged through the perforations 60 and 61 in the well casing 42. Simultaneously, acid is pumped by pump 47 down the annulus between the tubing strings 43 and 44, out ports 54 in the outermost tubing string, to be discharged through perforations 62 in the well casing and into the oil zone 56.

The pumping rates of the three pumps 47, 48 and 50 are adjusted so that the layers of oil being injected into the formations above and below the layer of acid being injected into the oil zone spread outwardly into the formations away from the well borehole at equal radial velocities. The oil being discharged through perforations 61 into the water zone 55, would tend to force the water out of the top of the water zone thus preventing it from diluting the acid being injected into the oil zone. It is to be recognized that in the event that one of the formations adjacent the oil zone 56, for example the other formation 57 above the oil zone 56, is of a nature which is not readily attacked by acid, then it would only be necessary to inject oil into the formation on the side of the oil-producing formation 56 which could be readily attacked by the acid. Where a well extends only to the bottom of an oil zone, it may be found that it is sufficient to inject a single oil blanket above the acid injection as the two fluids are being injected at equal radial velocities into the formation.

An alternate arrangement of equipment is shown in FIGURE 5 which is somewhat similar to the equipment shown in FIGURES 1, 2 and 3 except that the acid and oil injections are being carried out in an uncased well borehole 70. A well casing 71 is cemented into the upper portion of the borehole with a tubing string suspended within the casing 71. Carried on the lower end of the tubing string 72 are a pair of spaced packers 73 and 74 while the bottom of the tubing string 72 is closed, as by a plate 75. Perforations 76 are provided through the wall of the tubing string 72 between the packers 73 and 74, while a bypass conduit 77 is provided which extends through both the packers 73 and 74 so that fluid being pumped down the casing-tubing annulus 78 may pass through the bypass conduit 77 and enter the formation below the lowermost packer 74, as well as above the uppermost packer 73. Simultaneously, acid would be injected down the tubing string 72, out ports 76 and into the formation between the packers 73 and 74.

After acidizing a well in the manner of the present invention described with regard to FIGURES 1 to 3, the tubing string and associated acidizing equipment is removed from the well and the well is put on production in a normal manner well known to those in the field of well drilling. In the event that the acidization takes place in a manner illustrated in FIGURE 4, it is necessary to close at least the lower perforations 61, and preferably the upper perforations 60 also, in any manner well known to the art, as by cementing, after removing the acidizing equipment from the well and before putting the well on production.

By practicing the method of the present invention, a desired directional influence on the flow of acid into the formation is provided through the pressure interference of the upper and lower bodies of oil. Thus, the spreading disc-like acid injection is focused substantially horizontally or substantially in the bedding plane of the oil-producing formation. Thus, by using a relatively small volume of acid, a thin disc-shaped, well-fluid collection zone and flow channel is formed extending radially from the well borehole a considerable distance into the oil producing formation. This method of acidizing is considerably superior to other presently known methods used in many formations in that a disc-shaped zone of high permeability is formed in the oil-producing zone which increases the drainage area considerably in that, depending upon the pressure of the producing zone, oil above the acidized zone may drain by gravity into this collection zone from above, or oil below the zone may be forced substantially vertically thereinto from below by pressure, such as from a water drive below the oil-producing formation. Thus, by using the same amount of acid as in a normal acidizing method, a production increase by a factor of 3 or 4 may be realized. The fact that it is mainly the oil-producing formation adjacent the perforations through which acid is injected that is successfully treated in a manner described above, may be checked by running spinner surveys in the well casing to determine the amount of production fluid coming in the acid perforations and the oil perforations after the well is put on production. A survey of certain wells treated in accordance with the method of the present invention indicated that 65% or more of the oil entering the well casing enters through the ports through which acid was injected, while about equal ratios enter the other two ports through which a small amount of acid and a large volume of oil was injected.

I claim as my invention:

1. The method of treating an interval of an oil-producing formation traversed by a well to improve the permeability of said formation interval, said method comprising packing off a limited section of the oil-producing formation of the well above and below the interval to be treated, pumping a quantity of acid into the packed off section of the well, simultaneously pumping an oleophilic fluid into the well above and below said packed off section, and forming a permeable collection zone and flow area extending radially from said packed off portion of the well by focusing a quantity of acid into said packed-off portion of said oil producing formation, said acid focusing being accomplished by simultaneously injecting said oleophilic fluid from said well into said adjacent formation on each side of the packed-off acid-bearing portion, said injections being carried out at pressures sufficient to maintain the radial flows of said fluids into the formation at substantially equal velocities.

2. The method of claim 1 wherein the step of forming the collection zone is applied to the oil producing formation at a position relative to the upper and lower extremities of said producing formation so that the oil from a substantial portion of the oil-producing formation surrounding the well is positioned above the disc-shaped collection zone to permit vertical drainage from that portion of the producing formation into the collection zone.

3. The method of claim 1 wherein the step of forming the collection zone is applied to the oil producing formation relative to the upper and lower extremities thereof so that the oil from a substantial portion of the oil producing formation surrounding the well is positioned below the disc-shaped collection zone in a well wherein said oil-producing formation overlies a water-bearing formation under pressure.

4. The method of claim 1 including injecting acid into a minor interval of said producing formation whereby said acidizing fluid is caused to penetrate radially deep into the formation over a limited vertical distance.

References Cited in the file of this patent

UNITED STATES PATENTS

| | | |
|---|---|---|
| 2,259,429 | Simmons | Oct. 14, 1941 |
| 2,784,787 | Matthew et al. | Mar. 12, 1957 |
| 2,869,642 | McKay et al. | Jan. 20, 1959 |